United States Patent
Starks et al.

(10) Patent No.: US 9,727,426 B2
(45) Date of Patent: Aug. 8, 2017

(54) USING AN OVERINCLUSIVE WRITE RECORD TO TRACK AND WRITE CHANGES TO A STORAGE SYSTEM

(71) Applicant: Microsoft Technology Licensing, LLC, Redmond, WA (US)

(72) Inventors: John Starks, Seattle, WA (US); Angshuman Bezbaruah, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 248 days.

(21) Appl. No.: 14/631,674

(22) Filed: Feb. 25, 2015

(65) Prior Publication Data

US 2016/0246690 A1    Aug. 25, 2016

(51) Int. Cl.
    *G06F 12/00*    (2006.01)
    *G06F 11/14*    (2006.01)
    *G06F 3/06*     (2006.01)

(52) U.S. Cl.
    CPC .......... *G06F 11/1471* (2013.01); *G06F 3/06* (2013.01); *G06F 11/1435* (2013.01); *G06F 11/1451* (2013.01); *G06F 11/1464* (2013.01); *G06F 11/1441* (2013.01)

(58) Field of Classification Search
    CPC .......... G06F 11/1435; G06F 11/1451; G06F 11/1471; G06F 3/0644; G06F 3/0649; G06F 3/0653; G06F 11/1461
    USPC .......................................................... 711/162
    See application file for complete search history.

(56) References Cited

U.S. PATENT DOCUMENTS

| | | | |
|---|---|---|---|
| 5,664,187 A | 9/1997 | Burkes et al. | |
| 7,181,586 B2 | 2/2007 | Dallmann et al. | |
| 7,447,854 B1 | 11/2008 | Cannon | |
| 7,487,311 B2 | 2/2009 | Stroberger et al. | |
| 7,600,087 B2 * | 10/2009 | Yamagami | G06F 3/0619 711/161 |
| 8,131,969 B2 | 3/2012 | Roberson et al. | |
| 8,291,180 B2 | 10/2012 | Austruy et al. | |
| 8,326,803 B1 | 12/2012 | Stringham | |

(Continued)

OTHER PUBLICATIONS

"Advanced Restore—Virtual Server Agent for VMware", Retrieved on: Nov. 7, 2014, Available at: http://documentation.commvault.com/commvault/v10/article?p=products/vs_vmware/restore_adv.htm.

(Continued)

*Primary Examiner* — Mardochee Chery
(74) *Attorney, Agent, or Firm* — Workman Nydegger

(57) ABSTRACT

The writing of data to a storage system such that change tracking is efficiently performed. If a portion is to be written to the storage system, the system writes a write record indicating that a group of portions (that includes the particular portion) of the storage system is to be written to the storage system. This is represented even though those other portions are not being contemporaneously written to the storage system, and may in fact never be written. The particular portion is then written to the storage system. At some point thereafter, perhaps in the background, a change tracking structure is changed to reflect that the particular portion is written to the storage system, but without reflecting writes of all of the group of portions. The write record may then be invalidated. This reduces latency in systems that track changes with small cost at the time of backup.

23 Claims, 4 Drawing Sheets

(56) References Cited

U.S. PATENT DOCUMENTS

| | | |
|---|---|---|
| 8,443,166 B2 | 5/2013 | Czezatke et al. |
| 8,627,000 B2 | 1/2014 | Green et al. |
| 8,655,841 B1 * | 2/2014 | Sridharan ............ G06F 11/1461 707/609 |
| 8,671,082 B1 | 3/2014 | Yadav et al. |
| 8,689,047 B2 | 4/2014 | Kotagiri et al. |
| 8,719,286 B1 | 5/2014 | Xing et al. |
| 2012/0167080 A1 | 6/2012 | Vilayannur et al. |
| 2013/0019131 A1 * | 1/2013 | Tetzlaff ................ G11C 29/022 714/719 |
| 2014/0095823 A1 | 4/2014 | Shaikh et al. |
| 2016/0011816 A1 * | 1/2016 | Aizman ................ G06F 3/0604 711/117 |

OTHER PUBLICATIONS

"Changed Block Tracking (CBT) on Virtual Machines (1020128)", Retrieved on: Nov. 7, 2014, Available at: http://kb.vmware.com/selfservice/microsites/search.do?language=en_US&cmd=displayKC&externalId=1020128.

Yu, et al., "Dynamic Parity Grouping for Improving Write Performance of RAID-5 Disk Arrays", In Proceedings of International Conference on Parallel Processing vol. 2, Aug. 15, 1994, pp. 193-196.

* cited by examiner

USING AN OVERINCLUSIVE WRITE RECORD TO TRACK AND WRITE CHANGES TO A STORAGE SYSTEM

BACKGROUND

Computing systems and associated networks have revolutionized the way human beings work, play, and communicate, heralding in what is now termed the "information age". Data management is thus an important field in modern times. One aspect of data management is change tracking. For instance, it is often helpful to be able to distinguish what portions of data have changed between two instances in time.

As an example, when backing up a storage system, a copy of the storage system is written to a backup site. The next time the storage system is backed up, rather than copy again the entire storage system, only a changed subset of the storage system is backed up. Accordingly, to perform this incremental backup, determining which portions of the storage system have changed is a prerequisite. Furthermore, when recovering a storage system to a particular logical time (e.g., as during a recovery), change tracking allows the recovery system to determine which portions of the data are consistent with the state of the storage system at that particular logical time.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the writing of data to a storage system in a manner that change tracking is efficiently performed. Upon determining that a particular portion (e.g., a block in a block-based storage system, or a file in a file-based storage system) is to be written to the storage system, the system writes a write record indicating that a group of portions (that includes the particular portion) of the storage system is to be written to. This is represented even though those other portions within the identified group are not actually being contemporaneously written to the storage system, and may in fact never be written to the storage system. Thus, the write record is intentionally inaccurate to the extent that it represents that more portions are being written to the storage system than is actually the case. As an example, the write record may be an entry in a persistent log.

The particular portion is then written to the storage system. At some point thereafter, perhaps in the background, a change tracking structure is changed to reflect that the particular portion is written to the storage system, but without reflecting writes of all of the group of portions. In other word, the change tracking structure does properly reflect the portions that have actually changed, regardless of the over-inclusive write record. Thereafter, the write record may be deleted or rendered invalid.

Thus, if one ignores the background process of changing the change tracking structure to reflect the write (which may occur at any time without affecting latency since the write record itself is already persisted), there are two operations that occur; namely, the writing of the write record to the persistent storage (e.g., to the persistent log), and the writing of the particular portion to the storage system. This does represent an increase in what would be performed if no change tracking was to occur (in which case there would be no write of the write record). However, the additional write to the write record allows change tracking to occur, and is more efficient than conventional change tracking mechanisms if the group of portions identified in the write record happen to have one or more additional portions that are later written whilst the write record is still valid. In that case, those later written portions do not require an update in the write record, since the write record already guessed that that portion would be written. Accordingly, for those cases in which the write record correctly anticipated that the portion would be written to, there is little, if any, additional latency as compared to not having change tracking.

So long as the number of portions initially falsely identified as being written in the write record is kept to a certain limit, then the false identification comes with very little harm. For instance, once the particular portion is written, and the change tracking structure is properly updated, the write record may be deleted. Thus, the false information has no harmful effect in the case of normal operation. However, if there is a power failure between the time that the particular portion is written, and the time that the change tracking structure is updated, then the write record will be referenced to determine which portions to backup. Accordingly, in the worst case scenario, review of the write portion directs backup (and potentially later recovery) of more portions than was absolutely necessary. This does not affect the business logic, though might result in an ever-so-slight slowdown in backup (and potentially recovery). However, this may well be an acceptable downside considering the vastly reduced write latency achieved during normal operation.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

Figure 1:
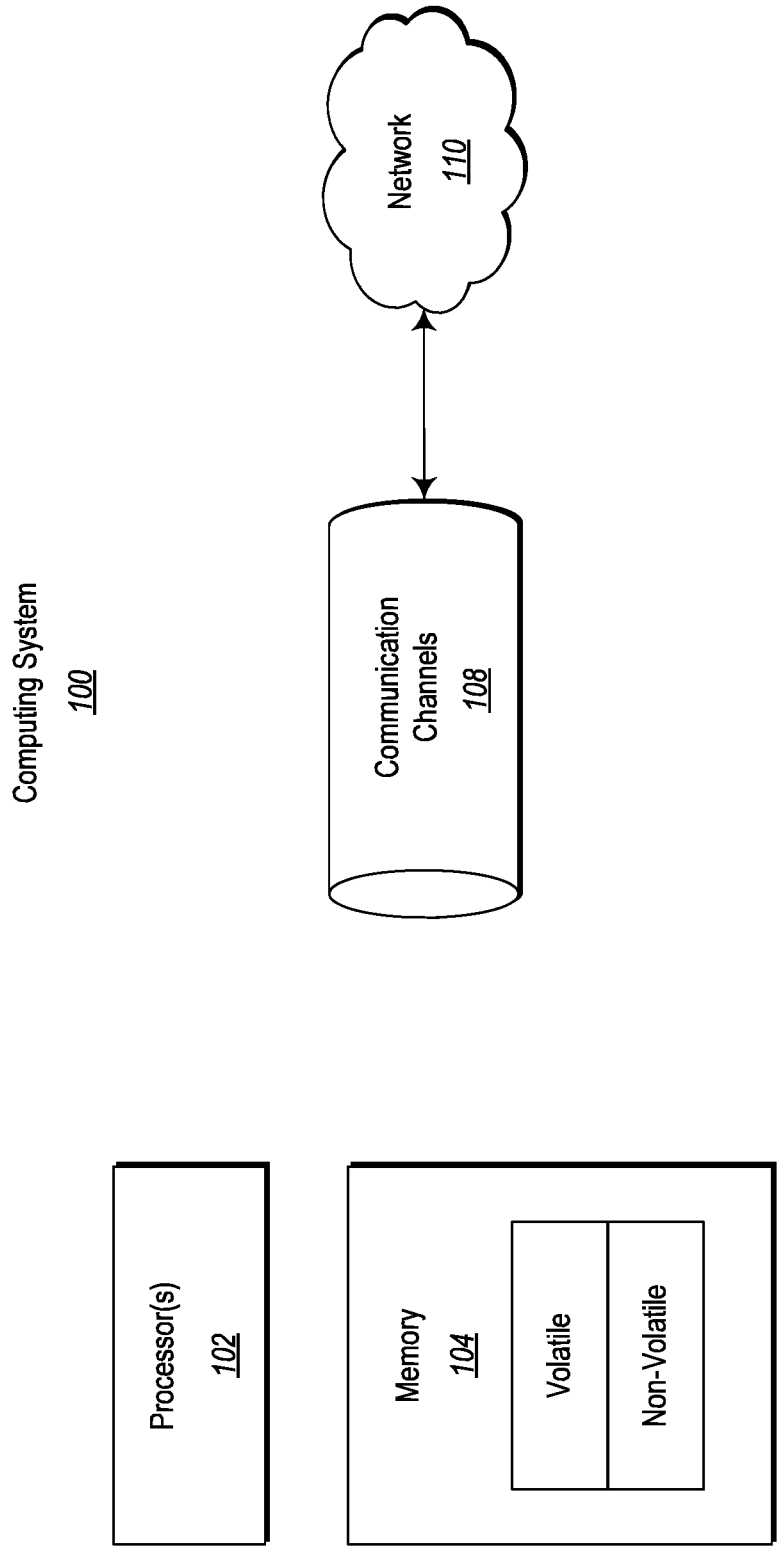
FIG. 1 abstractly illustrates a computing system in which some embodiments described herein may be employed.

At least some embodiments described herein relate to the writing of data to a storage system in a manner that change tracking is efficiently performed. Upon determining that a particular portion (e.g., a block in a block-based storage system, or a file in a file-based storage system) is to be written to the storage system, the system writes a write record indicating that a group of portions (that includes the particular portion) of the storage system is to be written to. This is represented even though those other portions within the identified group are not actually being contemporaneously written to the storage system, and may in fact never be written to the storage system. Thus, the write record is intentionally inaccurate to the extent that it represents that more portions are being written to the storage system than is actually the case. As an example, the write record may be an entry in a persistent log.

The particular portion is then written to the storage system. At some point thereafter, perhaps in the background, a change tracking structure is changed to reflect that the particular portion is written to the storage system, but without reflecting writes of all of the group of portions. In other word, the change tracking structure does properly reflect the portions that have actually changed, regardless of the over-inclusive write record. Thereafter, the write record may be deleted or rendered invalid.

Thus, if one ignores the background process of changing the change tracking structure to reflect the write (which may occur at any time without affecting latency since the write record itself is already persisted), there are two operations that occur; namely, the writing of the write record to the persistent storage (e.g., to the persistent log), and the writing of the particular portion to the storage system. This does represent an increase in what would be performed if no change tracking was to occur (in which case there would be no write of the write record). However, the additional write to the write record allows change tracking to occur, and is more efficient than conventional change tracking mechanisms if the group of portions identified in the write record happen to have one or more additional portions that are later written whilst the write record is still valid. In that case, those later written portions do not require an update in the write record, since the write record already guessed that that portion would be written. Accordingly, for those cases in which the write record correctly prophesized that the portion would be written to, there is little, if any, additional latency as compared to not having change tracking.

So long as the number of portions initially falsely identified as being written in the write record is kept to a certain limit, then the false identification comes with very little harm. For instance, once the particular portion is written, and the change tracking structure is properly updated, the write record may be deleted. Thus, the false information has no harmful effect in the case of normal operation. However, if there is a power failure between the time that the particular portion is written, and the time that the change tracking structure is updated, then the write record will be referenced to determine which portions to backup. Accordingly, in the worst case scenario, review of the write portion directs backup (and potentially later recovery) of more portions than was absolutely necessary. This does not affect the business logic, though might result in an ever-so-slight slowdown in backup (and potentially recovery). However, this may well be an acceptable downside considering the vastly reduced write latency achieved during normal operation.

Some introductory discussion of a computing system will be described with respect to FIG. 1. Then, the structure and operation of embodiments described herein will be presented with respect to subsequent figures.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors (of the associated computing system that performs the act) direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other computing systems over, for example, network 110.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. The computer executable instructions may be, for example, binaries or even instructions that undergo some translation (such as compilation) before direct execution by the processors, such as intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Figure 2:
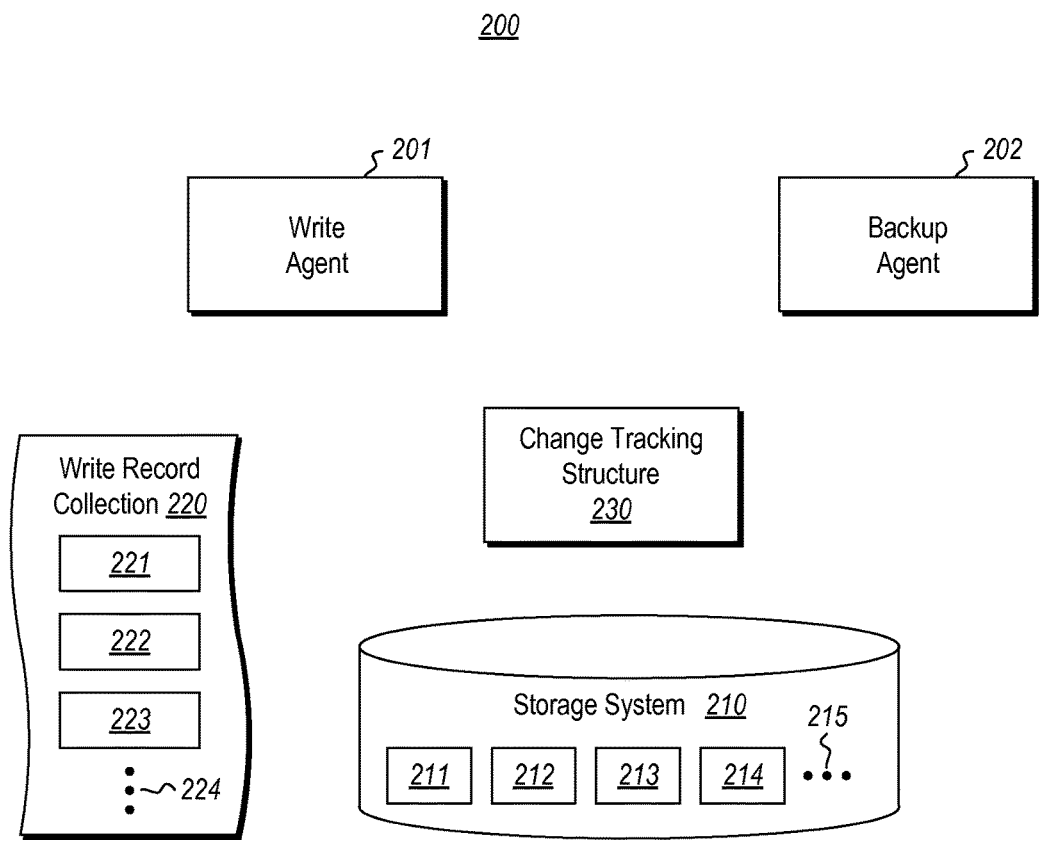
FIG. 2 illustrates a computing environment in which the principles describe herein may operate, and which includes a write agent, a backup agent, a storage system, a write record collection, and a change tracking structure.

FIG. 2 illustrates a computing environment 200 in which the principles describe herein may operate. The computing environment includes a write agent 201, a backup agent 202, a storage system 210, a write record collection 220, and a change tracking structure 230. While the computing environment 200 may be supported by a single computing system, the computing environment 200 may also be distributed. Furthermore, some or all of the components described as being attributed to the computing environment 200 may be performed in a cloud computing environment, such as a public cloud, a private cloud, or a hybrid cloud.

The storage system 210 is illustrated as including a number of portions 211, 212, 213, 214, amongst potentially many others as represented by the ellipses 215. Of course, the principles described herein are not limited to the number of portions within the storage system 210. Accordingly, the ellipses 215 represent that there may be any number of portions within the storage system 210, each capable of holding data. In fact, there may be even millions or billions of portions within the storage system.

If the storage system 210 were a block-based storage system, the portions 211 through 215 might be blocks. If the storage system 210 were a file-based storage system, then the portions 211 through 215 might be files. If the storage system 210 were blob storage, then portions 211 through 215 might be unstructured data. If the storage system 210 was a database, then portions 211 through 215 might be records and/or tables. The storage system 210 may be local to the write agent 201. Alternatively, or in addition, the storage system 210 might be remote from the write agent 201. There might alternatively be portions of the storage system 210 that are local, and portions of the storage system 210 that are remote from the write agent 201. In addition, as previously mentioned, the storage system 210 might be partially or fully within a cloud computing environment.

The computing environment 200 also includes a persisted write record collection 220 that includes one or more write records. In the illustrated embodiment, the write record collection 220 is illustrated as including three write record collections 221, 222 and 223. However, the ellipses 224 represent that there may be any number of write records within the write record collection 220. The write records identify portions of the storage system 210 including portions that have been written to the storage system 210, as well as portions that the write agent 201 estimates might be written to the storage system 210 (for reasons that will be described in further detail below) before the next time the change tracking structure 230 is updated. In one example, the write record collection 220 is a persisted write log, and the write records 221 through 224 are write entries written into the log.

The computing environment 200 also includes a change tracking structure 230, which tracks a time that each portion 211 through 215 in the storage system 210 had last changed. For instance, that time might be a physical time (also called "wall clock time") or a logical time (also called "application time"). Accordingly, the change tracking structure 230 may be used to determine a state of the storage system 210 as of a particular point in time, and perhaps also detect differences in the storage system 210 between different instances in time. The principles described herein are not limited to the type of change tracking structure 230. For instance, the change tracking structure might use a bitmap to identify portions that have changed since a given point in time. The change tracking structure might use sequence numbering to assign a sequence number to each portion representing the last logical time that the portion changed. Change tracking structures that have not even been invented yet may be used consistent with the principles described herein.

Figure 3:
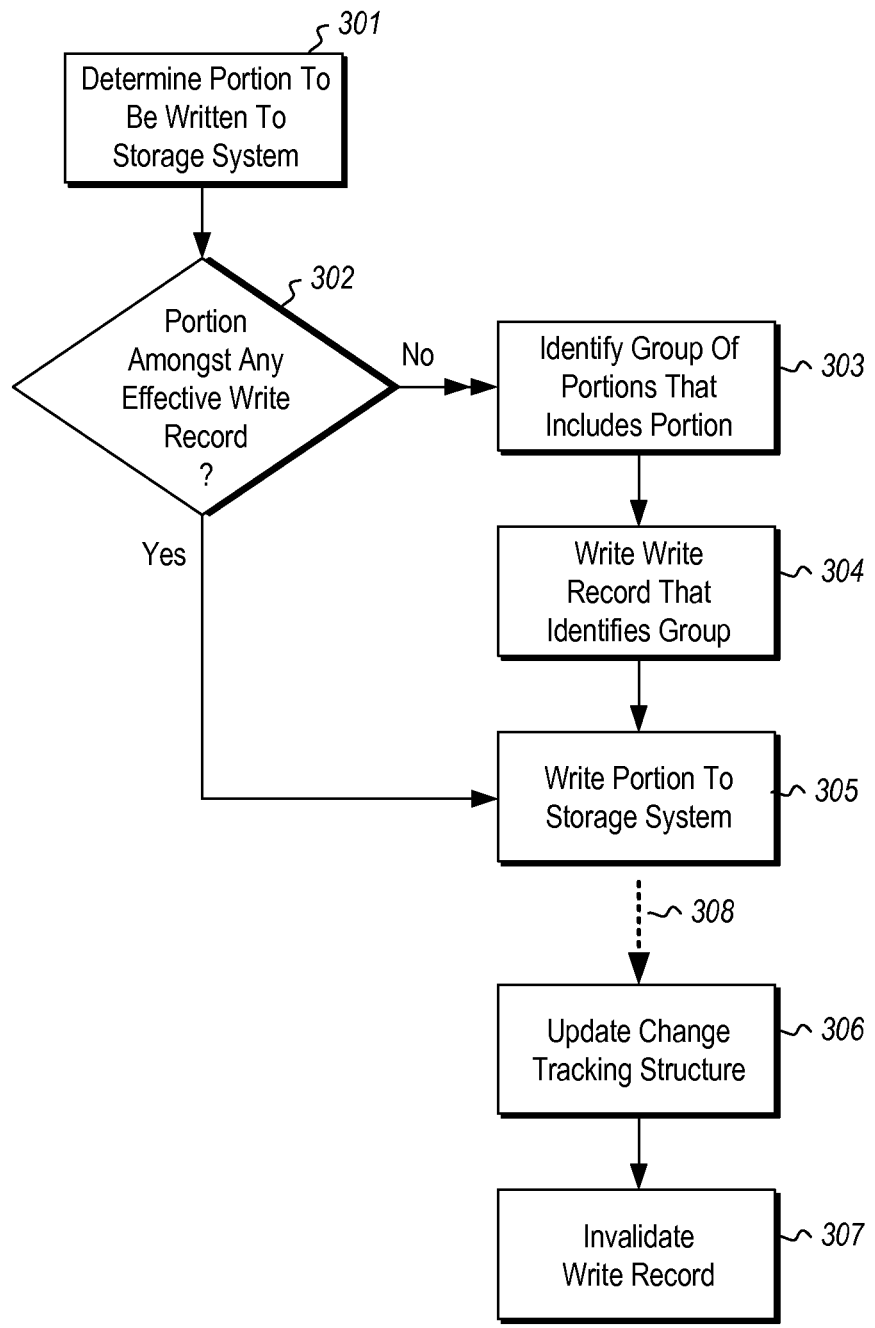
FIG. 3 illustrates a flowchart of a method for writing to a storage system, which may be performed by the write agent of FIG. 2.

FIG. 3 illustrates a flowchart of a method 300 for writing to a storage system. The method 300 may be performed by the write agent 201 when writing to the storage system 210 of FIG. 2. Accordingly, the method 300 of FIG. 3 will now be described with frequent reference to the computing environment 200 of FIG. 2.

The method 300 is initiated upon the write agent determining that a particular portion of the storage system is to be written to (act 301). As an example, referring to FIG. 2, suppose that the write agent 201 determines that portion 211 of the storage system 210 is to be written to.

The write agent then determines whether or not this portion is amongst the group of portions in any of the write records (decision block 302) that is yet effective within the write records collections. The reason for this decision will be described further below. However, for now, referring to FIG. 2, assume that portion 211 is not amongst any of the write records 221 through 224 of the write records collection 220 ("No" in decision block 302).

In that case ("No" in decision block 302), the write agent identifies a group of portions (including the portion that is to be written) that are to be included within a write record (act 303). For instance, in FIG. 2, suppose that the write agent 201 selects portions 211, 212 and 213 to include within a write record 221, even though portions 212 and 213 are not contemporaneously written to along with portion 211. The write agent 201 is simply making a guess at portions that might be shortly written given that portion 211 is to be presently written to the storage system 210.

The principles described herein are not limited to how the group of portions that are to be included in the write record are selected. However, correct guessing of future writes based on the current write is helpful to further reduce the average number of operations per write, since a correct guess eliminates the need for writing another write record. Correct guessing would rely on a determination that the group of portions are estimated to have higher write correlation with the particular portion. This is a question of information theory. The determination tries to estimate what portions of the storage system will be written given as a clue that the particular portion has been written. A correct estimate will depend on a variety of factors. However, as an example, the group of portions might be contiguous portions with the particular portion within an address space (such as a virtual address space and/or a physical address space). Another example is that the group of functions might include portions that are common to a particular file or related collection of files. The estimate might also review historical behavior of the computing environment to guess what portions might be written to next.

After identifying the group of portions to include within the write record (act 303), the write agent writes a write record indicating that a group of portions of the storage system is written to (act 304). The write portion is persisted in the write record collection in case there is a system failure prior to the write being properly reflected in the change tracking system (act 306). If there is such a failure, then the backup system will assume that all writes mentioned in the write record have been successful, and thus will use the writes mentioned in the write record to determine which portions to copy during the next incremental backup. For instance, in FIG. 2, the write agent 201 might write a write record 221 to the write record collection 220. This write record 221 is of course persisted, and thus would survive a power failure of the computing environment 200.

The write record 221 includes of course an indication that the portion 211 is written to. Oddly enough, and for reasons described hereinafter, the write record 221 also includes an indication that one or more additional portions are being written to, even though those additional portions are not being written to contemporaneously with the write of the portion 211. For instance, the write record might also indicate that portions 212 and 213 were written to.

After writing the write record (act 304), the write agent writes the particular portion to the storage system (act 305). For instance, referring to FIG. 2, the write agent 201 writes the particular portion 211 to the storage system 210. However, note that the write agent 210 did not write the portions 212 and 213 to the storage system 210, even though the write portions 212 and 213 are identified in the write record 221. Accordingly, the write record 221 is at least partially incorrect.

In normal operation, where there is no power failure of the computing environment, the write agent will in the background update the change tracking structure to reflect that the particular portion (and any other portions that are indicated in the meantime as to be written to) is written to (act 306), but will not reflect that the entire group of portions identified in the write portion have been written to. For instance, referring to FIG. 2, the write agent 201 will update the change tracking structure 230 to reflect that the portion 211 has been updated, but will not reflect in the change tracking structure 230 that the portion 212 and 213 have been written to. Thus, the changes to the change tracking structure 230 reflect the actual changes to the storage system, whereas the write record is over-inclusive and thus is partially inaccurate, representing that portions are being written that are in fact not being written.

After the change tracking structure is updated (act 306), the write record may optionally be invalidated (act 307) (e.g., deleted), so as to no longer be considered in future processing of decision block 302 with respect to other portions to be written. For instance, in FIG. 2, after the change tracking structure 230 is updated to reflect the writing of the portion 211 to the storage system 210, the write record 221 may be deleted. The fact that the updating of the change tracking structure (act 306) may occur in the background and at a time that is least imposing on the computing environment 200 is represented by the dotted arrow 308. Thus, the cost of updating the change tracking structure is minimal, and can be deferred for long periods of time for the convenience of the system.

Thus, if one ignores the background process of updating the change tracking structure (act 306) to reflect the write and invalidating of the write record (act 307), there are two operations that occur; namely, the writing of the write record to the persistent storage (act 304), and the writing of the particular portion to the storage system (act 305). This does represent an increase in what would be performed if no change tracking were to occur (in which case there would be no write to the write record). However, the additional write to the write record allows change tracking to occur, and is more efficient than conventional change tracking mechanisms if the group of portions identified in the write portion happens to have one or more additional portions that are later written. In that case, those later written portions do not require an update in the write record, since the write record already guessed that they would be written and remains effective since the change tracking has not yet been updated for the prior write operation. Accordingly, for those cases in which the write record correctly anticipated that the portion would be written to, there is little, if any, additional latency as compared to not having change tracking.

For instance, referring to FIG. 2, suppose that write record 221 is still effective since the change tracking system 230 has not yet been updated (i.e., act 304 has not yet been performed). Recall that the write record 221 correctly identified portion 211 as written to and incorrectly indicated portions 212 and 213 as written to).

Given that circumstance, in accordance with method 400, the write agent determines that another portion of the storage system is to be written (act 301). For instance, suppose that the write agent 201 determines that another portion 212 of the storage system 210 is to be written to.

The write agent then determines whether or not this additional portion is amongst the group of portions in any of the write records (decision block 302) that is yet effective. In the case of writing portion 212 whilst write record 221 is still effective, the portion 212 is indeed identified in the yet effective write record 221 ("Yes" in decision block 302). Accordingly, the write agent 201 determines that the additional portion 212 is to be written to the storage without any update to the write record due to the additional portion 212 already being identified within the write record. In other words, acts 303 and 304 are bypassed. Furthermore, the additional portion 212 is written to the storage system (act 305). Later, in the background, the change tracking structure 230 may be updated (act 306).

Now suppose there is an additional portion to be written, which is portion 213 of the storage system (again act 301). However, now assume that write record has been deleted or otherwise invalidated since the previous writes of portions 211 and 212 have been updated in the change tracking structure 230. In this case, the write record 221 is not valid, and none of the other write records in the write record collection reference portion 213 ("No" in decision block 302). In that case, a second group of portions (e.g., portions 212 and 213) are identified (act 303) and the appropriate write record (e.g., write record 222) is written to the write record write record collection 220) (act 304), indicating that the portions 212 and 213 are written to, even though portion 212 was not written to since the last time the change tracking structure 230 was updated. The portion 213 is then written to the storage system (act 305). Thereafter, in the background, the change tracking structure 230 may be updated (act 306).

Figure 4:
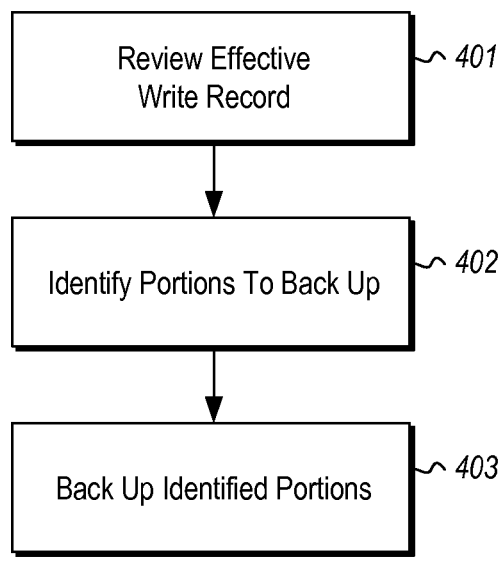
FIG. 4 illustrates a flowchart of a method for backing up at least part of the storage system using a write record, and which may be performed by the backup agent of FIG. 2.

FIG. 4 illustrates a flowchart of a method 400 for performing incremental backup (or replication) of the storage system. Of course, for changes that are reflected in the change tracking system, the appropriate portions may be backed up using the change tracking system. However, the method 400 is most interesting where a write record identifying a group of portions is still effective. This means that the group of portions identified within that write record is not certain to be reflected in the change tracking system. Accordingly, the method 400 is performed for each effective write record in the write record collection.

For instance, suppose that after the portions 211 and 212 are written to the storage system 210, that a failure occurs prior to the change tracking system being updated (act 306). In that case, there is still a persisted write record 221 that indicates correctly that portions 211 and 212 have been written to, and falsely indicates that portion 213 has been written to. A backup agent 202 reviews the write portion 221 (act 401) to determine which portions of the storage system to backup (act 402). In this case, write portion 221 indicates that portions 211, 212 and 213 are to be backed up. The backup agent 202 then backs up all of the portions 211, 212 and 213 identified in the write portion (act 403). Of course, this backing up was not strictly necessary for portion 213 since portion 213 did not need backing up. However, this is a small price to pay given that being over-inclusive in the write record reduces average write latency.

Accordingly, the principles described herein provide an efficient mechanism for keeping track of changes while still providing average low write latency. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for tracking and writing changes to a storage system, the method comprising:
    determining that a first portion of a storage system is to be written to;
    determining whether the first portion of the storage system is included within write records currently contained in a write record collection;
    if the first portion of the storage system to be written to is not contained within current write records, then performing the following:
        (i) based on the determined first portion of the storage system to be written to, predicting one or more additional portions of the storage system which are candidate portions which seem likely to be written to based on a correlation to the first portion;
        (ii) updating the write records of the write record collection by adding the first portion and the candidate portions to the write records; and
        (iii) thereafter performing a write to the first portion of the storage system but not to the candidate portions of the storage system; and
    if the first portion of the storage system is contained within current write records, then foregoing any additional update to the write records since the first portion is already contained in the write records, and then performing a write operation to the first portion of the storage system.

2. The method in accordance with claim 1, further comprising:
    periodically tracking changes made to portions of the storage system that have been written to in order to identify and store such changes;
    based on the updated write records of the write record collection, updating the tracked changes to reflect that the first portion has been written to.

3. The method in accordance with claim 2, further comprising:
    after updating the tracked changes based on the updated write records of the write record collection, invalidating the write records contained in the write record collection.

4. The method in accordance with claim 1, further comprising:
    determining that a second portion of the storage system is to be written to;
    determining that the second portion is one of the predicted candidate portions already added to the write record of the write record collection;
    foregoing any additional update to the write records since the second portion is one of the predicted candidate portions already added to the write records; and
    performing a write operation to the second portion of the storage system but not to any other candidate portions of the storage system;

periodically tracking changes made to portions of the storage system that have been written to in order to identify and store such changes;
based on the updated write records of the write record collection, updating the tracked changes to reflect that the first and second portions have been written to; and
after updating the tracked changes based on the updated write records of the write record collection, invalidating the write records contained in the write record collection.

5. The method in accordance with claim 1, wherein the storage system is a block-based storage system.

6. The method in accordance with claim 1, wherein the storage system is a file-based storage system.

7. The method in accordance with claim 1, wherein the write record is a log entry in a persisted log.

8. The method in accordance with claim 1, further comprising:
determining that a second portion of the storage system is to be written to;
determining that the second portion is not contained within the updated current write records;
predicting one or more additional candidate portions of the storage system which seem likely to be written to based on a correlation with the second portion;
updating the write records by adding the second portion and the additional candidate portions to the write records;
performing a write operation to the second portion of the storage system but not to any other candidate portions of the storage system;
periodically tracking changes made to portions of the storage system that have been written to in order to identify and store such changes;
based on the updated write records of the write record collection, updating the tracked changes to reflect that the first and second portions have been written to; and
after updating the tracked changes based on the updated write records of the write record collection, invalidating the write records contained in the write record collection.

9. The method in accordance with claim 1, further comprising backing up the storage system by performing:
based on the updated write records of the write record collection, determining which portions of the storage system to backup; and
backing up all portions of the storage system corresponding to the updated write records irrespective of whether write operations have occurred to all portions of the data base system contained in the updated write records or not.

10. The method in accordance with claim 1, wherein predicting the one or more candidate portions of the storage system comprises determining portions of the storage system that are estimated to have higher write correlation with the first portion than other portions of the storage system.

11. The method in accordance with claim 10, wherein the higher correlation is based on portions of the storage system that are contiguous in an address space.

12. The method in accordance with claim 11, wherein the address space is a virtual address space.

13. The method in accordance with claim 11, wherein the address space is a physical address space.

14. The method in accordance with claim 10, wherein the higher correlation is based on portions of the storage system that define a common file.

15. The method in accordance with claim 10, wherein the higher correlation is based on portions of the storage system that define a related collection of files.

16. A method for tracking and writing changes to a storage system, the method comprising:
determining that a first portion of a storage system is to be written to;
determining whether the first portion of the storage system is included within write records currently contained in a write record collection;
if the first portion of the storage system to be written to is not contained within current write records, then performing the following:
(i) based on the determined first portion of the storage system to be written to, predicting one or more additional portions of the storage system which are candidate portions which seem likely to be written to based on a correlation with the first portion;
(ii) updating the write records of the write record collection by adding the first portion and the candidate portions to the write records; and
(iii) thereafter performing a write to the first portion of the storage system but not to the candidate portions of the storage system;
if the first portion of the storage system is contained within current write records, then foregoing any additional update to the write records since the first portion is already contained in the write records, and then performing a write operation to the first portion of the storage system; and
in the event of subsequently writing to any candidate portions, foregoing any additional update to the write records since the candidate portions are already contained in the write records, and then performing write operations for each such subsequent candidate portion.

17. The method in accordance with claim 16, further comprising:
periodically tracking changes made to portions of the storage system that have been written to, including any candidate portions subsequently written to, in order to identify and store such changes;
based on the updated write records of the write record collection, updating the tracked changes to reflect and portions that have been written to; and
after updating the tracked changes based on the updated write records, invalidating the write records contained in the write record collection.

18. The method in accordance with claim 16, further comprising:
backing up the storage system by performing the following:
based on the updated write records of the write record collection, determining which portions of the storage system to backup; and
backing up all portions of the storage system corresponding to the updated write records irrespective of whether write operations have occurred to all portions of the data base system contained in the updated write records or not.

19. The method in accordance with claim 16, wherein predicting the one or more candidate portions of the storage system comprises determining portions of the storage system that are estimated to have higher write correlation with the first portion than other portions of the storage system.

20. The method in accordance with claim 19, wherein the higher correlation is based on portions of the storage system that are contiguous in an address space.

21. The method in accordance with claim 19, wherein the higher correlation is based on portions of the storage system that define a common file.

22. A computing system comprising:
one or more processors;
a memory containing computer-executable instructions which, when executed by the one or more processors, cause the computing system to instantiate an architecture that performs a method for tracking and writing changes to a storage system, wherein the method comprises:
  determining that a first portion of a storage system is to be written to;
  determining whether the first portion of the storage system is included within write records currently contained in a write record collection;
  if the first portion of the storage system to be written to is not contained within current write records, then performing the following:
    (i) based on the determined first portion of the storage system to be written to, predicting one or more additional portions of the storage system which seem likely to be written to based on a correlation with the first portion;
    (ii) updating the write records of the write record collection by adding the first portion and the candidate portions to the write records; and
    (iii) thereafter performing a write to the first portion of the storage system but not to the candidate portions of the storage system;
  if the first portion of the storage system is contained within current write records, then foregoing any additional update to the write records since the first portion is already contained in the write records, and then performing a write operation to the first portion of the storage system; and
  backing up the storage system by performing the following:
    based on the updated write records of the write record collection, determining which portions of the storage system to backup; and
    backing up all portions of the storage system corresponding to the updated write records irrespective of whether write operations have occurred to all portions of the data base system contained in the updated write records or not.

23. A system in accordance with claim 22, wherein in the event of subsequently writing to any candidate portions, foregoing any additional update to the write records since the candidate portions are already contained in the write records, and then performing write operations for each such subsequent candidate portion.

* * * * *